US008527381B2

(12) United States Patent
Gerstner et al.

(10) Patent No.: US 8,527,381 B2
(45) Date of Patent: Sep. 3, 2013

(54) SYSTEM AND METHOD FOR AUTHORIZING THIRD-PARTY TRANSACTIONS FOR AN ACCOUNT AT A FINANCIAL INSTITUTION ON BEHALF OF THE ACCOUNT HOLDER

(75) Inventors: Penny L. Gerstner, Gastonia, NC (US); Carrie L. Heise, Charlotte, NC (US); Marilyn C. Kane, Sanibel, FL (US); Stephen M. Kaufmann, Matthews, NC (US); Christopher G. Keller, Ballwin, MO (US); Kelly Kruse, Charlotte, NC (US); Gerard H. Poll, Davidson, NC (US); Catherine S. Pullen, Mount Holly, NC (US); Faith A. Tucker, Wichita, KS (US); Richard G. Tucker, Jr., Charlotte, NC (US); Vickie M. Van Meir, Charlotte, NC (US); Deborah M. Winick, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 2007 days.

(21) Appl. No.: 10/707,327

(22) Filed: Dec. 5, 2003

(65) Prior Publication Data
US 2005/0125321 A1 Jun. 9, 2005

(51) Int. Cl.
*G06Q 40/00* (2012.01)
(52) U.S. Cl.
CPC ....................................... *G06Q 40/00* (2013.01)
USPC ........................................................... 705/35
(58) Field of Classification Search
CPC .................................................... G06Q 40/00
See application file for complete search history.

(56) References Cited

U.S. PATENT DOCUMENTS

| | | | | |
|---|---|---|---|---|
| 5,220,501 A | * | 6/1993 | Lawlor et al. | 705/40 |
| 5,465,206 A | * | 11/1995 | Hilt et al. | 705/40 |
| 5,649,117 A | * | 7/1997 | Landry | 705/40 |
| 5,870,724 A | * | 2/1999 | Lawlor et al. | 705/42 |
| 6,128,603 A | * | 10/2000 | Dent et al. | 705/40 |
| 6,317,745 B1 | * | 11/2001 | Thomas et al. | 707/100 |
| 6,493,685 B1 | | 12/2002 | Ensel et al. | |
| 7,240,031 B1 | * | 7/2007 | Kight et al. | 705/40 |

(Continued)

OTHER PUBLICATIONS

Fewer Glitches for Switchers It is easier than Ever to Change Accounts, says Stephen Ellis, Stephen Ellis, The Daily Telegraph, London UK Nov. 17, 2001, p. 11 (2 pages).*

(Continued)

*Primary Examiner* — Bruce I Ebersman
(74) *Attorney, Agent, or Firm* — Michael A. Springs; Moore & Van Allen, PLLC; Padowithz Alce

(57) ABSTRACT

System and method for authorizing third-party transactions for an account at a financial institution on behalf of the account holder. A financial institution can collect process, transmit and confirm authorizations to third parties for electronic payments and direct deposits on behalf of its account-holder customer. In at least some embodiments, a method of processing account-holder requests to authorize third-party transactions for an account includes the establishment of a pre-existing list of prospective third-party participants such as employers and billers. The financial institution receives account-holder requests to authorize third-party transactions. Specific requests from among the account-holder requests are matched to third-party participants and forwarded and can be confirmed. The system of the invention can include various engines and data repositories that work together to provide the means for implementing embodiments of the invention.

33 Claims, 6 Drawing Sheets

(56) References Cited

U.S. PATENT DOCUMENTS

| | | | |
|---|---|---|---|
| 7,376,587 B1* | 5/2008 | Neofytides et al. | 705/26 |
| 7,398,239 B2* | 7/2008 | Barsade et al. | 705/35 |
| 7,693,790 B2* | 4/2010 | Lawlor et al. | 705/40 |
| 2001/0032182 A1* | 10/2001 | Kumar et al. | 705/40 |
| 2001/0034676 A1* | 10/2001 | Vasic | 705/30 |
| 2001/0047330 A1* | 11/2001 | Gephart et al. | 705/39 |
| 2002/0007345 A1* | 1/2002 | Harris | 705/44 |
| 2002/0026575 A1* | 2/2002 | Wheeler et al. | 713/156 |
| 2002/0129248 A1* | 9/2002 | Wheeler et al. | 713/170 |
| 2003/0105711 A1* | 6/2003 | O'Neil | 705/39 |
| 2003/0182230 A1* | 9/2003 | Pessin | 705/39 |
| 2003/0191711 A1* | 10/2003 | Jamison et al. | 705/40 |
| 2003/0225688 A1* | 12/2003 | Dobbins | 705/39 |
| 2004/0139009 A1* | 7/2004 | Kozee et al. | 705/40 |
| 2005/0010523 A1* | 1/2005 | Myklebust et al. | 705/40 |
| 2005/0015329 A1* | 1/2005 | Tyson-Quah | 705/38 |

OTHER PUBLICATIONS

Internet Article, "Switching Banks Made Easier", BBC News, Business, http://news.bbc.co.uk/i/hi/business/311895.stm, (Jul. 31, 2003).

Internet Article, Karen Murray, "Don't Let The Banks Rip You Off—Get Switching", MoneyExtra Feature, http://www.moneyonline.co.uk/features/2002/f220502_banking_03.html (May 23, 2003).

Internet Article, "How to Switch Bank Accounts", SwitchBanks With Which, http://switchwithwhich.co.uk/bankhow.html (printed Nov. 14, 2003).

"Bank Simplifies New-Account Opening To Help Boost Debit Card Volumes", ATM & Debit News, Section: Debit Card News; vol. 3, No. 23; p. 1 (Jun. 20, 2002).

"Charter One Simplifies Process of Switching Banks", PR Newswire, Section: Financial News, Cleveland, (Jun. 3, 2002).

"Charter One Develops Account-Switcher Software", The American Banker, Section: Technology: Online Banking, p. 11 (May 10, 2002).

* cited by examiner

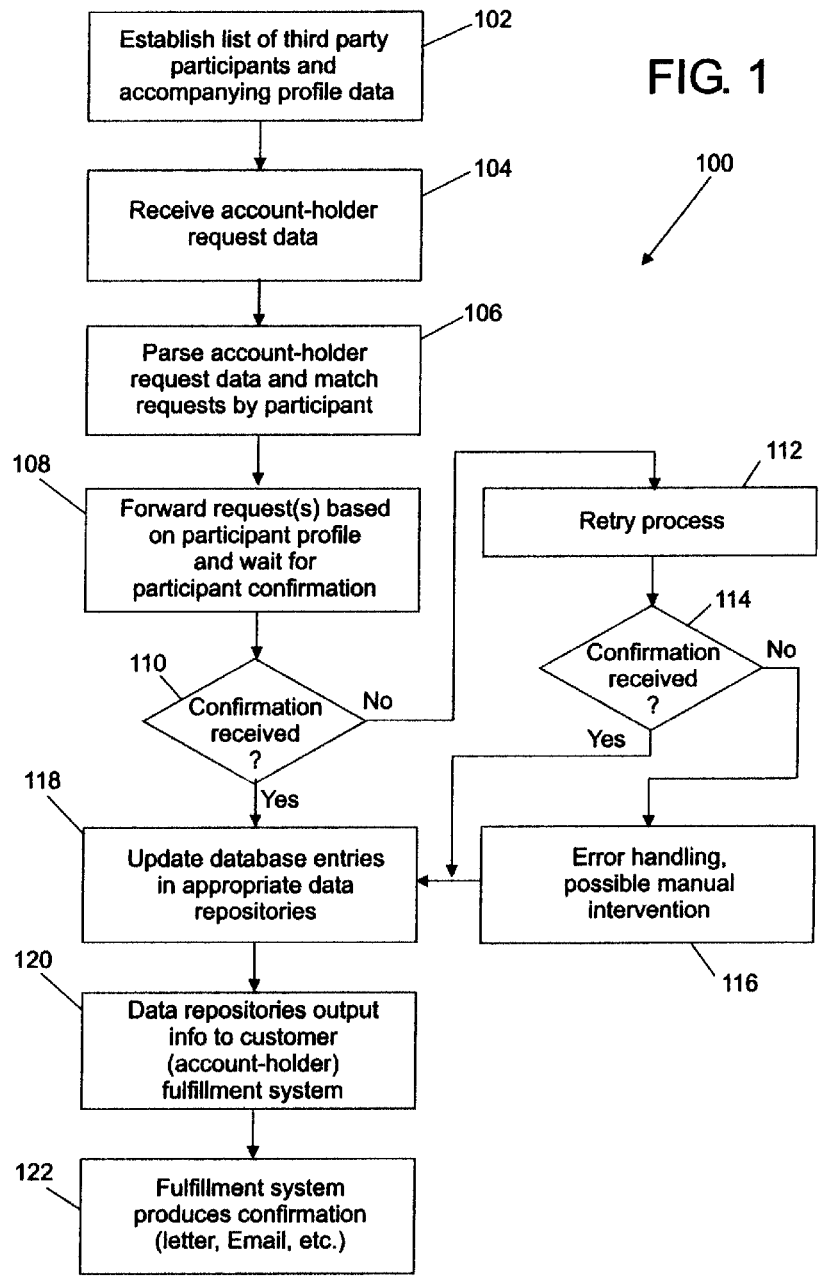

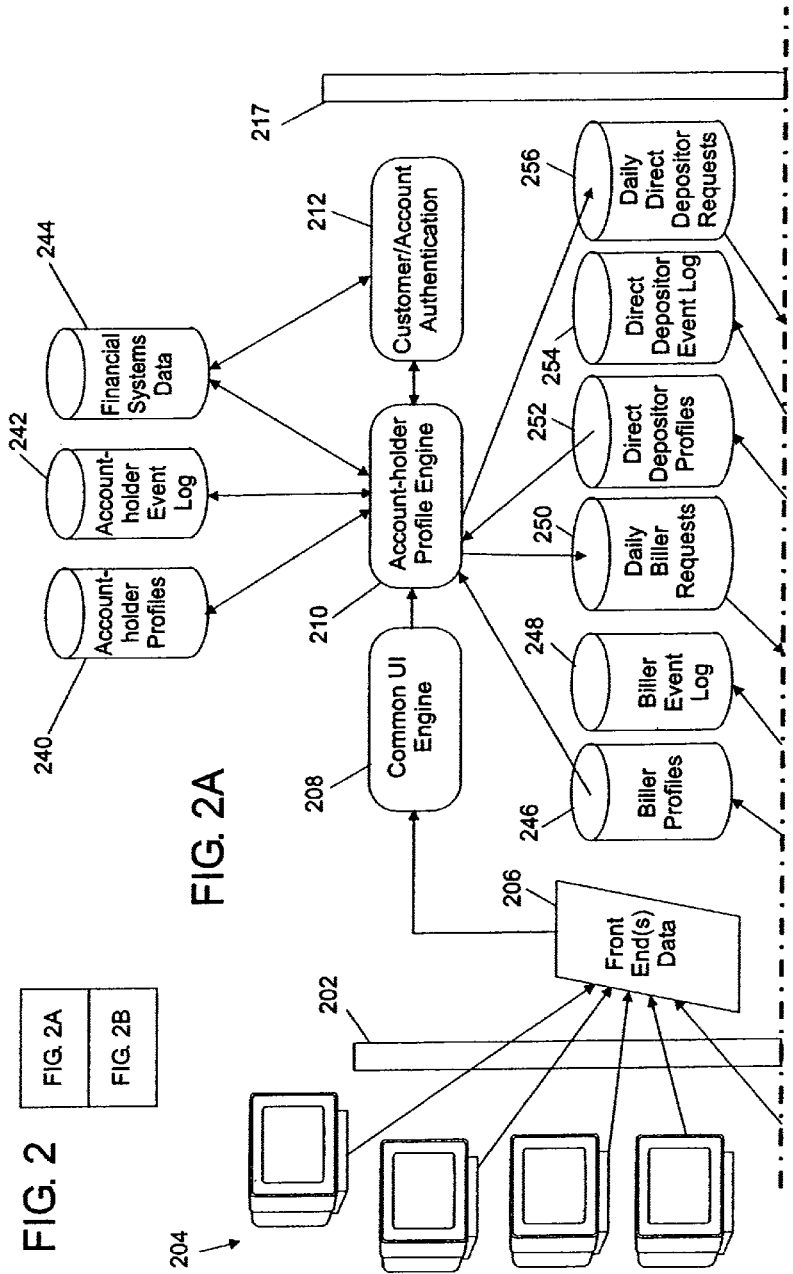

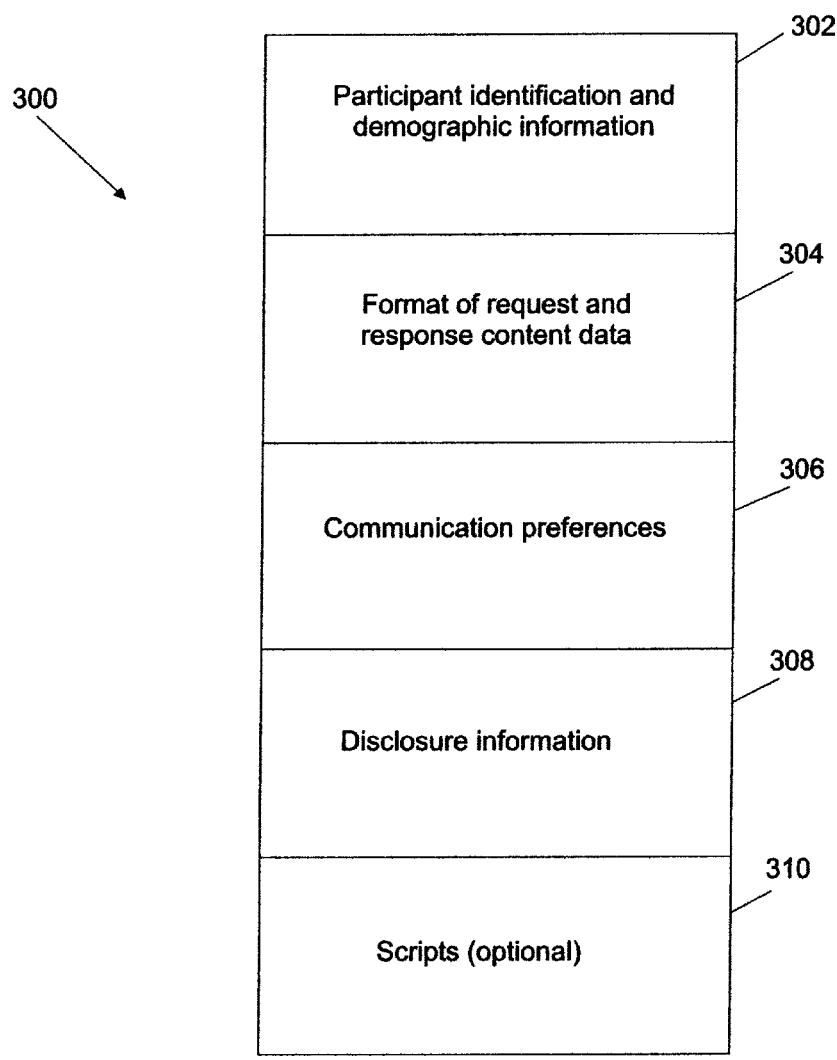

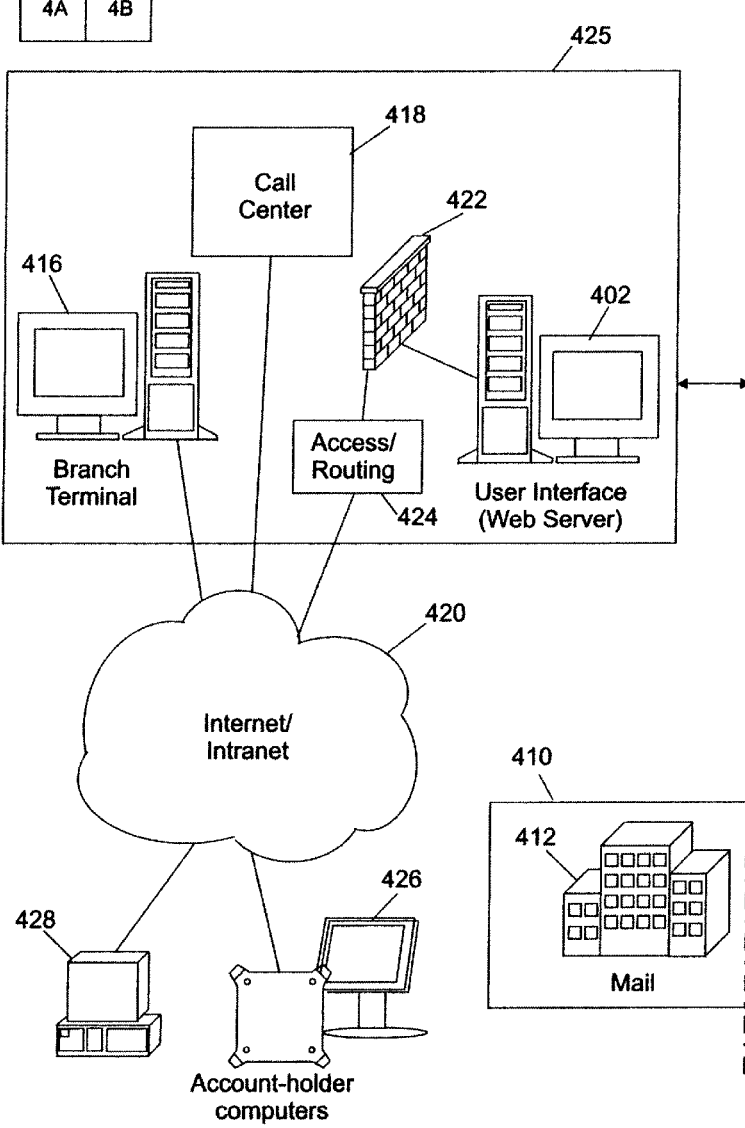

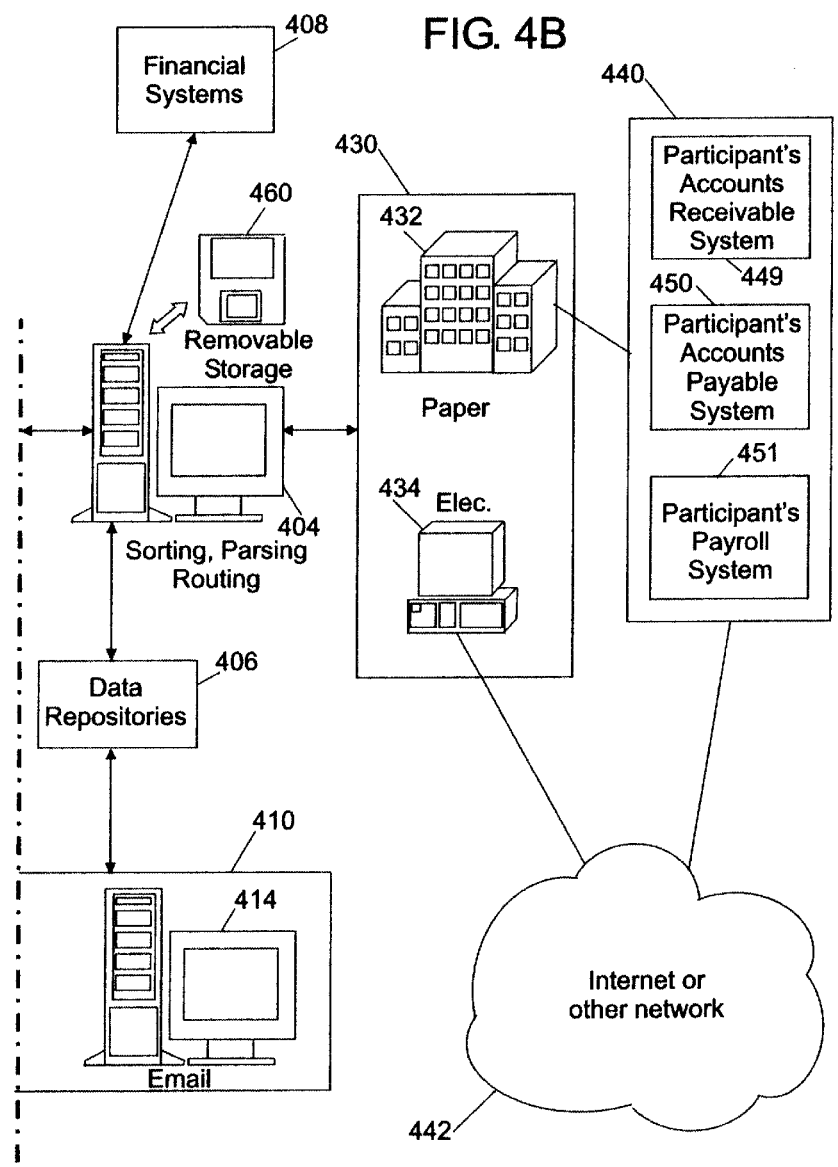

SYSTEM AND METHOD FOR AUTHORIZING THIRD-PARTY TRANSACTIONS FOR AN ACCOUNT AT A FINANCIAL INSTITUTION ON BEHALF OF THE ACCOUNT HOLDER

BACKGROUND OF INVENTION

Automatic drafts or debits, and direct deposits are electronic alternatives to the traditional, consumer and business banking processes of writing checks and making deposits using paper forms. These automated alternatives are well understood and have existed for many years. In the case of drafts or debits, an account-holder customer of a bank or similar financial institution contacts the biller to arrange the debits or drafts. In the case of debits to a bank account, the account holder provides the biller with routing and transit information for his or her bank account, or a copy of a voided check. The biller is typically a third party (that is, not the account holder or the bank) to whom the account holder makes regular payments, such as for an electric bill, a magazine subscription, a mortgage payment, etc. Once the biller has received the account-holder's authorization to deduct payments from the account-holder's account including the bank account information, the biller automatically debits the account-holder's account as bills become due. These debits are often made through the Automated Clearing House (ACH) Network. The ACH Network is a highly reliable and efficient nationwide, batch-oriented electronic funds transfer system for interbank clearing of electronic payments. The ACH Network is operated by a conglomeration of entities, including the U.S. Federal Reserve. It is well known and will not be discussed in additional detail. Many third-party billers will also arrange automatic debits to a card product such as credit or debit card account, in which case, one of the many card networks is used to process the payment.

Direct deposits are typically made to a bank account, or banking type of account at a financial institution, however, credits applied to a credit account are analogous to direct deposits. In most cases, account holders will arrange a direct deposit for salary received from an employer, although other types of payments, such as insurance payments, or government payments can also be received by direct deposit. In any case, to arrange a direct deposit, the account holder contacts the third-party direct depositor and provides the appropriate account information, just as in the case of automatic drafts. The direct depositor then automatically and electronically transfers the appropriate amount of money into the account-holder's account when payment is due. Direct deposits, like automatic drafts, often make use of the ACH Network.

Historically, banking customers have arranged both automatic drafts and direct deposits through the use of paper forms. Recently, some business entities have provided electronic means to arrange these transactions, typically via a secure Web site, or some secure personal computer software application. However, even when automatic drafts and/or direct deposits are arranged using electronic means, the arranging of at least some of these transactions involves the account holder contacting each responsible third party directly in some way. Thus, at least some changes to these transactions, for example, a change as to which specific bank or other account a transaction is to be applied, involves the account holder again contacting the responsible third-party biller or direct depositor to arrange the change. A consumer or business that makes extensive use of automatic drafts and direct deposits by multiple third parties can find the task of making such a change daunting, since it requires multiple billers and/or direct depositors to be notified. Thus, the size of this task effectively deters some consumers and businesses from moving an account to a new financial institution, or even changing which account is used for such transactions within a financial institution.

SUMMARY OF INVENTION

The present invention, by way of example embodiments herein presented, provides for a method and system whereby a financial institution can collect, process, transmit and confirm authorizations to third parties for electronic payments and direct deposits on behalf of its account-holder customer. Through access to centralized authorizations through the financial institution, a customer can be relieved of much of the repetitive burden of contacting various third parties to arrange for or make changes to automatic draft payments and direct deposits. Such relief can be especially beneficial when a customer who makes extensive use of automatic payments and/or direct deposits changes financial institutions, or changes accounts within the same financial institution, as may be required if the security of the old account has been compromised. The benefits of the invention, however, are not limited to these situations.

In at least some embodiments of the invention, a method of processing account-holder requests to authorize third-party transactions for an account includes the establishment of a pre-existing list of prospective third-party participants. These third-party participants can be direct depositors such as employers, and billers such as utility companies. The financial institution receives account-holder requests to authorize third-party transactions. Specific requests from among the account-holder requests are matched to third-party participants. At least one request is forwarded to at least one participant, but multiple requests can be forwarded to a given participant, either from one account holder or from multiple account holders at the financial institution. A request for an automated transaction is forwarded to the third-party participant on behalf of the account holder, so that the account holder does not have to contact the participant entity directly. In at least some embodiments, the financial institution receives a participant confirmation from each specific third-party participant, and forwards an account-holder confirmation to the account holder.

Information on third-party participants and account-holder customers can be stored in data repositories at the financial institution. This information can include participant profiles or account-holder profiles as the case may be. These profiles can include communication preferences for the relevant parties. Communication preferences can include, for example, whether a participant or an account holder prefers electronic communication or paper communication with the financial institution. Specifics can be provided, such as whether the Internet or some other form of electronic communication is used to handle communication with a third-party participant. Additionally, data on past and pending account-holder requests, confirmations and other events can be maintained.

In some embodiments, the system of the invention can include various engines and data repositories that work together to provide the means for implementing embodiments of the invention. Some of these can be implemented manually or using paper-based means. Even in embodiments where all of the engines and data repositories are computerized, the creation and use of paper records as part of the processes disclosed can be supported.

For example, a system according to some embodiments includes a user interface to receive account-holder requests to authorize the third-party transactions. This user interface can make use of the Internet, such as by a secure Web site. At least one engine can be operatively connected to the user interface to perform sorting, parsing, and matching as needed to handle the requests. A third-party participant interface can be provided to forward the specific requests to the specific third-party participants. In some embodiments, the financial institution will have an established relationship with the third-party participants, and interactive, electronic communications between the participant and the financial institution can be supported. At least one data repository is connected within the system, and can include third-party participant profiles, as well as account-holder information and any other data that needs to be maintained. In some embodiments, a fulfillment system provides account-holder confirmation of specific requests. The fulfillment system can provide these communications according to stored account-holder preferences, which may include electronic or paper-based communications.

In some embodiments, the invention is, at least in part implemented via a computing platform or a collection of computing platforms interconnected by one or more networks, such as the Internet, a corporate intranet, and/or some other form of electronic communication. A computer program product or products containing computer programs with various instructions can be used to cause the hardware to carry out, at least in part, the methods of the invention. Software engines can be operated on servers or workstations. Data repositories are operatively connected to the engines. Such data repositories can reside on the same platform as some or all of the various software engines or they can reside on a database server connected over a network.

BRIEF DESCRIPTION OF DRAWINGS

FIG. 1 is a flowchart illustrating a method according to some embodiments of the invention.

FIG. 2 is broken into FIGS. 2A and 2B for clarity.

FIG. 3 is a schematic representation of information contained in a participant profile in a data repository according to at least some example embodiments of the invention.

FIG. 4 is a network diagram illustrating the hardware and network connections involved in implementing an example embodiment of the invention. FIG. 4 is broken into FIGS. 4A and 4B for clarity.

DETAILED DESCRIPTION

Figure 2B:
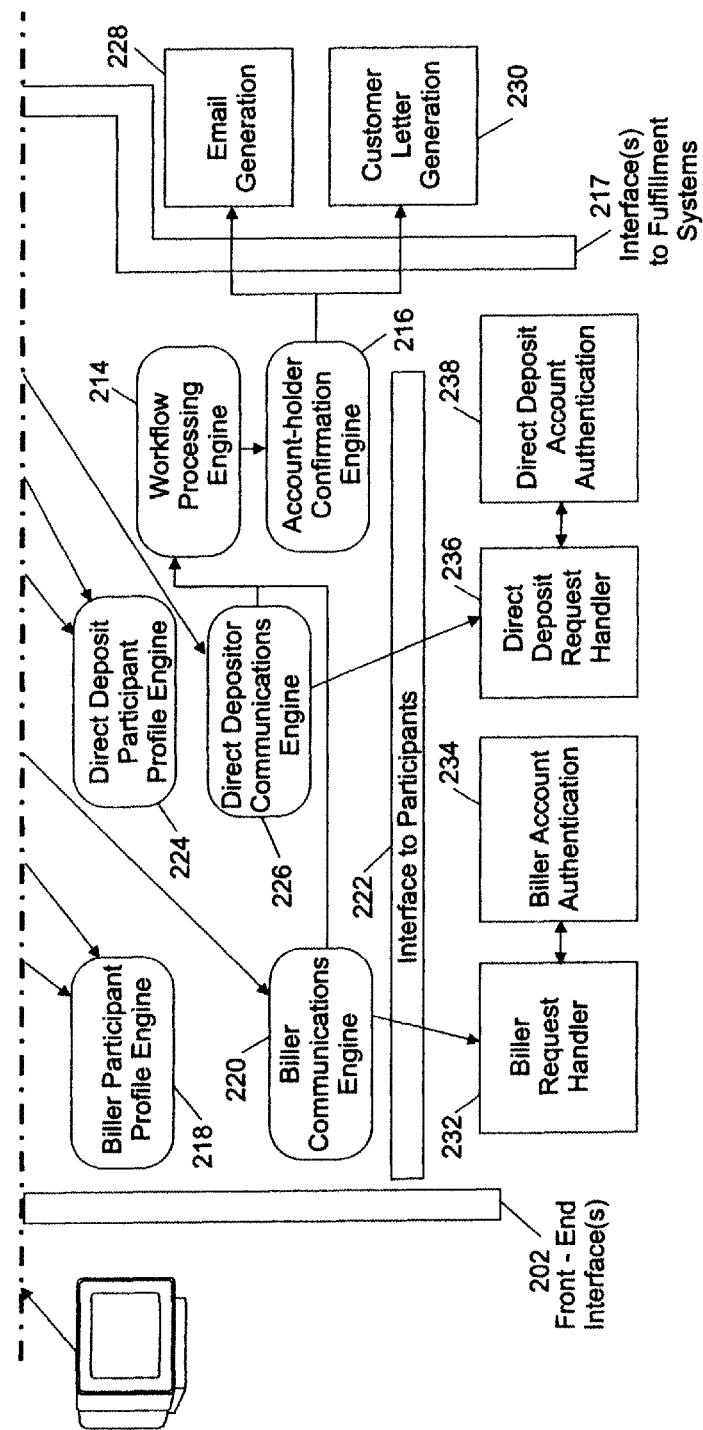
FIG. 2 is a system block diagram showing various system software engines, data repositories, and other elements and how they are interconnected according to some embodiments of the invention.

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, the steps or sub-processes of the process or method may be performed in any order or simultaneously, unless the contrary is clear from the context, or is expressly stated. Also, the time that elapses between steps can vary. It should also be understood that with respect to flowcharts, block diagrams, and data structures, not every possible signal flow, data path, or structure element is shown. Rather, for clarity, only those important to the inventive concepts being discussed may be illustrated, although others may be discussed in this description.

The meaning of certain terms as used generally in the context of this disclosure should be understood as follows. The term "financial institution" is used herein in its broadest sense. Financial institutions that process transactions of the type discussed can include banks, credit unions, stock brokerages, credit card companies, loan agencies, and other types of institutions that are not strictly banks in the historical sense. The use of the term "financial institution" herein is meant to encompass all such possibilities.

The terms "third party," "third-party participant," "participant," and the like are in most cases meant to refer to entities to which an account holder would pay money upon receiving a bill and/or entities that would make direct deposits to an account-holder's account. Third-party participants can be "direct depositors" and/or "billers." The term "third party" is used because in the typical case, such an entity is yet a third entity after considering the customer account-holder and the financial institution. However, the term is meant to encompass the situation where the "third party" may be the financial institution itself acting in another capacity. For example, an account holder may process a loan payment to the same bank in which the account resides using the methods and systems according to embodiments of the invention. Likewise, automated transfers between accounts at a bank can be considered automatic drafts or direct deposits, depending on the point of view. Any of these types of transactions can be considered "third-party transactions." Such transactions can also include check card transactions and in fact, any transaction whereby the authority to perform the transaction can be granted to the third party by the account holder and thereinafter resides with the third-party debitor or depositor. Regardless, as used herein, the term "account holder" is meant to refer to a person, entity, business, etc. who owns or controls the account at the financial institution to which these transactions apply. An account holder can also be referred to as a "customer" of the financial institution.

The term "user" and related terms such as "user interface" as used herein are meant in the broadest sense. An account holder or customer of a financial institution can be a "user" of a system according to embodiments of the invention, especially where transaction authorization requests are submitted from the account-holder's personal computer over the Internet. As will be discussed below, a "user" can also be an employee of a financial institution who inputs or manages information at a branch office for a customer. In some cases, a participant may be a user, especially if the participant has interactive access to a system according to an embodiment of the invention.

FIG. 1 shows an example process or method according to the invention, in flowchart form. As is typical with flowchart illustrations, various sub-processes, elements, or steps are represented by process blocks. At block 102 the financial institution establishes a list of prospective third-party participants. This can be done in many ways. The financial institution may wish to solicit businesses and employers to participate in a commercial service offering, to the advantage of all parties. Alternatively, the list could be comprehensive list established from public records, from the financial institution's own records for from some other source. The list can be segmented or sorted by geography, zip code, types of entities, etc. At block 104, the institution receives account-holder request data, which includes requests to set-up, transfer, or maintain direct debit(s) and/or direct deposit(s). These requests can be received through an employee user, on behalf of the consumer, directly from a business or government account-holder, or directly from a consumer account-holder, perhaps via the Internet. An interactive application can be used to gather the request data. Such an application can identify the customer, present a list of potential accounts, and present a list of potential participants perhaps based on the customer account-holder's zip code. A set-up window can be displayed with information about the third-party participant as well as fields for all the data elements for the request that the participant has previously identified. Disclosures pertinent to the participant (from a participant profile data repository to be discussed in more detail later) can be displayed. A record of the request data received can be made in a database or data repository for future reference.

At block 106 of FIG. 1, the requests are parsed and specific requests are matched to specific participants. This sorting and routing function is typically performed by a server or networked computing platform. At block 108, specific requests are forwarded to the appropriate third-party participants. This can be done in such a way to accommodate each participant's specific communication preferences. It can be done in real time or in batch mode via computer networks, such as the Internet or some other form of electronic communication, or even be forwarded via a printed request sent through the postal service or a courier. Once the requests are forwarded, the financial institution waits for confirmation of requests from third-party participants. During this time, which in some cases may be only fractions of seconds, the participant's systems process the request(s). This processing can involve updates to a participant's accounts receivable system, accounts payable system or payroll system to affect the set-up, maintenance or transfer of the debit(s) and/or direct deposit(s). Such updates can occur in a completely automated fashion, or be completely or partially effectuated manually, in which case, the wait time for confirmation back to the financial institution can be significant. In either case, the waiting is represented by decision block 110. A specific wait time can be built into the system of the invention. If confirmation is not received at block 110 in this time, a retry process can be initiated and carried out at block 112. Decision block 114 represents branching dependent on the outcome of retry process 112. If there is still no confirmation from a third-party participant of an account-holder request, error handling can be undertaken at block 116.

Once confirmation has been received at any of blocks 110, 114, or 116 (via some error handling/recover process), database entries in appropriate data repositories are updated in this example at block 118. In example embodiments, once confirmations for an account-holder's requests are received and logged, the data repository can generate an information output to a confirmation production system or customer fulfillment system, at block 120. The fulfillment system in this case produces a confirmation to be sent to the account holder at block 122. This confirmation may take many forms, such as, but not limited to, Email, postal mail or even a telephone call made either manually or by an automated telephone dialing system. The form of confirmation can be tailored to each account-holder customer based on stated preferences.

FIG. 2 illustrates one, specific example system software architecture that can be used to implement an example embodiment of the invention. FIG. 2 is broken into FIGS. 2A and 2B for clarity. It cannot be over-emphasized that the architecture of FIG. 2 is an example only. Indeed, there are infinite possibilities as to how a system that implements embodiments of the invention can be designed. Front-end interface(s) 202 receive third-party transactions requests and manage communication with account holders, financial institution employees, etc. The communications may be with individual customers, businesses, financial institution branch employees who are assisting customers, etc. These entities are represented by communication terminals 204, which may be personal computers, servers, and the like. Front-end data 206 that is received via interface 202 is first processed by the common UI (user interface) engine, 208. The common UI engine can provide a Web browser based user interface that will display the appropriate Web pages to gather the data necessary to set up accounts with biller and direct depositor participants in order to support the recurring payments and direct deposits. This interface may be interactive, in that it can provide for viewing customer profiles and status information. It may also provide feedback to verify that the data is entered correctly.

Account-holder profile engine 210 communicates with various databases within the data repositories that are involved in implementing an embodiment of the invention. Engine 210 also manages customer/account authentication process 212. The customer/account authentication process verifies that the account holder is who they say they are and that they have the authority to authorize third-party transactions. In the case where a financial institution employee is assisting an account-holder customer, this could be done, at least in part, manually. Account-holder profile engine 210 also matches a participant with an account-holder's account and the request in order to authorize a recurring payment or direct deposit against that account. The account-holder profile engine can also provide for modifying third-party transactions and participants, such as replacing one with another, or deleting a participant and any corresponding transactions. Account-holder profile engine 210, in this example, also maintains the status of the relationship between accounts and participants, and records information on transaction requests.

Workflow processing engine 214 of FIG. 2 manages the flow of data, including results, between the various communication engines, and common UI engine 208. In some embodiments, workflow processing engine 214 can attempt to correct any errors through reiterative transmissions with biller communication engine 220 and direct depositor communication engine 226 prior to sending results to account-holder confirmation engine 216. Account-holder confirmation engine 216, using the financial systems data 244, in at least some embodiments, determines the method and time of day for communicating to the account holder. As previously discussed, this communication can take a form according to the account-holder's preferences. In this example embodiment, this communication takes place via the interface, 217, to a customer fulfillment system, which generates confirmation communications to account holders.

Biller participant profile engine 218, in example embodiments, adds new biller participants to the system, deletes existing biller participants from the system, and changes stored information about biller participants. It can also be designed to handle queries and return lists of biller participants, for example, by business type or zip code. Biller communications engine 220, in this example, sorts daily biller requests by biller participant, generates instructions for each account holder to acquire the proper information for a participant as part of a transaction request, then sends requests to the biller's systems. These requests are sent through participant interface 222. The format can be according to individual biller communication preferences that can be specified in a biller's participant profile as will be discussed in more detail later.

The direct depositor participant profile engine, 224, in this embodiment adds new direct depositor participants to the system, deletes existing direct depositor participants from the system, and changes stored information about direct depositor participants. It can also be designed to handle queries and return lists of direct depositor participants, for example, by business type or zip code. Direct depositor communications engine 226, in this example, sorts daily direct deposit requests by direct deposit participant, generates instructions for each account holder to acquire the proper information for a participant as part of a transaction request, then sends requests to the direct depositor's systems. These requests are sent through participant interface 222. The system can be designed so that the format is according to individual direct depositor communication preferences that can be specified in a participant's profile. All of the financial institution's systems, engines, data repositories, etc. can be subject to reporting, monitoring, and tracking for or by information technology and management personnel as is known in the art.

A customer fulfillment system in example embodiments of the invention can include an Email generation system, 228, and a letter generation system, 230, to provide confirmations to account holders. Biller participant systems can include a biller request handler, 232. The biller request handler can receive files from biller communications engine 220, and verify the successful receipt. For each transaction, the request handler can direct the setup of an auto-debit recurring transaction with the account-holder's specified account, direct changes to standing transactions, stop an auto-debit, or update account information as needed. The biller request handler can also generate a response as to the status of a change request and send the results back to the financial institution. A biller account authentication process, 234, provides account authentication services within a biller's systems, for example, to verify that the financial institution's account holder is actually a customer of the biller.

Direct depositor participant systems can include a direct depositor request handler, 236. The direct depositor request handler can receive files from direct depositor communications engine 226, and verify the successful receipt. For each transaction, the request handler can direct the setup of a recurring direct deposit with the account-holder's specified account, direct changes to standing transactions, stop a recurring direct deposit, or update account information as needed. The direct depositor request handler can also generate a response as to the status of a change request and send the results back to the financial institution. A direct depositor account authentication process, 238, provides account authentication services within a direct depositor's systems, for example, to verify that the financial institution's account holder is actually an employee or other proper recipient of funds from the direct depositor.

In example embodiments of the invention, a data repository or data repositories can be organized into individual databases or data stores as needed. In the example of FIG. 2, account-holder profiles database 240 contains information about the request including the selected participants, the selected accounts, status, the selected methods of payment, etc. for each account-holder customer of the financial institution. The account-holder event log, 242, contains a record of all the activity that has occurred against the account-holder profiles to support any questions or issues that may arise. Financial systems database, 244, contains the demographic information about the account holder which can be obtained from the account-holder's customer records.

Biller profiles database 246 contains information about biller participants. This information can include name, type of company, zip code, and communication preferences, content data for transaction requests and returned responses, and similar information. Biller event log 248 contains a record of the activity that has occurred against the biller profiles to support any questions or issues that may arise. The daily biller requests database, 250, contains the requests that have been generated for processing by the various biller participants. If the system is set up for batch processing, these may be accumulated throughout the day in preparation for overnight file transmissions to those participants.

Direct depositor profiles database 252 contains information about direct depositor participants. This information can include name, type of company, zip code, and communication preferences, content data for transaction requests and returned responses, and similar information. Direct depositor event log 254 contains a record of the activity that has occurred against the direct depositor profiles to support any questions or issues that may arise. The daily direct depositor requests database, 256, contains the requests that have been generated for processing by the various direct depositor participants. If the system is set up for batch processing, these may be accumulated throughout the day in preparation for overnight file transmissions to those participants. Again, the organization, architecture, and content of the data repositories discussed herein represents only an example of how data repositories supporting an embodiment of the invention can be set up.

As discussed above, the appropriate data repositories in embodiments of the invention can contain third-party (biller or direct depositor) information. This information can be stored in the form of a participant profile, which can provide considerable flexibility in the way the financial institution deals with third-party participants. FIG. 3 is a schematic representation of an example participant profile, 300. The profile in this example can include participant identification and demographic information 302, which can include a company identifier, a company name, address, and telephone numbers, primary and support contact information, and a list of zip codes or other types of geographies serviced by the company. Content data 304 can include formatting information regarding both account-holder requests and participant responses. Such data can include, but is not limited to, a list of required data elements, a list of optional data elements and format information. Format information can include, for example, delimiters, and/or (extensible markup language (XML) document formats with field labels, etc. With respect to participant confirmation responses, the content data can also include a list of response codes, and data elements associated with each response code.

Communication preferences 306 of FIG. 3 can be included to specify methods of communication and communication paths to be used with the participant. These methods can include batch files sent via the Internet or possibly some other from of electronic communication, Emails with attachments, via a Web site, etc. Disclosure information 308 is where legal disclosure which might be required by a participant can be stored for presentation to an account holder at the appropriate time, which may be at the time third-party transaction requests are collected from the account holder. Finally, scripts 310 can be provided to aid in gathering appropriate information from account holders.

As previously discussed, the use of stored profiles can allow the communication processes between a financial institution, participants, and account holders to be tailored to the preferences of individual parties, assuming appropriate hardware and software systems are in place. Request information can be written in XML format within a customer request repository for processing in real time or at the end of a business day in batch fashion. A participant's preferences in a participant profile can specify message transport, such as over HTTPS, TCP/IP with a URL address, IBM System Network Architecture (SNA) over a dedicated connection, SOAP (simple object access protocol)/HTTPS over TCP/IP with a URL address, etc.

Real time processing for sending transaction requests to participants can be accomplished, for example, by Website access or real-time messaging. In the case of Website access, XML data can be parsed and merged into a script from the participant profile. The script can then be executed. If the script executes successfully, the result can be recorded in the appropriate event log, creating a record in a "processing completed in real-time" file. The record can then be deleted from a "process pending in real-time" file. If the script fails, a specified number of retries can be attempted. If the script still fails, this result can be recorded in the event log, creating a record in a "processing failed in real-time" file for error handling, as previously discussed, which may include manual processing. The record can then be deleted from a "process pending in real-time" file.

If the type of communication is "real-time messaging" and XML is used, XML data is parsed and put into the message format specified in the participant profile.

The message can be sent according to the participant's communication preferences. If a confirmation is received from the participant that the message was received and processed successfully, the result can be recorded in the appropriate event log, creating a record in a "processing completed in real-time" file, and then deleting the record from a "process pending in real-time" file. If a participant communicates that the message was received but failed to be processed, that result can be recorded in the event log, creating a record in a "processing failed in real-time" file for error handling and then deleting the record from a "process pending in real-time" file.

If no confirmation is received from a third-party participant, retries can be attempted. If no confirmation is forthcoming, this result can again be recorded in the appropriate event log for error handling (and deleted from a pending file) as before.

As an example of batch processing of requests, such requests can be handled at the end of the business day. The requests can be stored in a list in a "to be processed at end of day" file and sorted by a participant identifier so that all account-holder requests throughout the data for a given third-party participant will be together for processing. This list can be read, and saved as a record in a "process pending at end of day" file. Again, if XML is used to format this list, the XML data is parsed and put in a record format specified in the participant's profile. That record can then be written to a file. A copy of the file can be sent to a participant according to the participant's communication preferences. If a confirmation is received that indicates the file was received and processed successfully, the result is recorded in an appropriate event log, creating a record in a "process completed at end of day" file. If there are indications of a failure, a record can be created in a "processing failed at end of day" file, in a fashion similar to that described above with reference to real-time processing. Likewise, retries can be attempted if no confirmation is received from a participant. For paper or Email transmission of all customer requests for a given participant, the process can be similar. In such a case, XML data can be merged with a form template to create a report with all the account-holder requests for the participant that can be printed or attached to an Email.

FIG. 4 provides a network diagram showing network connections and hardware platforms that can be used to implement example embodiments of the invention. FIG. 4 is broken into FIGS. 4A and 4B for clarity. Again, it cannot be overemphasized that FIG. 4 provides an illustrative example only, as many different network configurations can be architected by one of skill in the art. In the example system of FIG. 4, at least some aspects of the common user interface are provided by Web server 402. Computing platform 404, in this example, a server, provides sorting, parsing, and routing functions, and implements at least some of the software engines, for example, the profile engines, the workflow processing engine, the biller communication engine, and the direct depositor communication engine. Computing platform 404 communicates with data repositories 406 and financial systems 408, wherein financial systems data and the account-holder authentication process reside. Fulfillment system 410 produces account-holder confirmations via either a mail processing facility, 412, or an Email system, 414, as previously discussed. Computing facilities (not shown) within the fulfillment system also maintain the account-holder confirmation engine. Because many of its functions relate to sorting and routing transaction requests, computing platform 404 may be referred to herein as a sorter/router.

Financial institution branch terminal 416 and terminals at the financial institution's call center, 418, can be used to input third-party transaction authorization requests on behalf of account-holder customers. These terminals can be implemented by standard computing platforms and connected to the common user interface via the Internet or a corporate intranet, 420. In the case of an Internet connection, firewall 422 and the normal access and routing arrangements, 424, can be included in the system, as is well-understood in the art. These components can be viewed as forming a front-end interface or front-end infrastructure, 425. In a case where connectivity is provided by a corporate intranet, the corporate intranet may also be considered part of the front-end interface. Also in the case of an Internet connection, it is possible to allow account-holder customers of the financial institution to access the system directly via secure Web site or dedicated application, as from their own personal computers, 426 and 428. These various access devices can receive account specific information from financial systems element 408, which provides existing account and financial institution relationship data. The functionality available to users via any of these access methods can be determined by the user's level of authorization and may be customized in accordance with the needs of the user and/or their access element, as is well-understood in the art. Transmissions between the above-discussed hardware elements may be supported by Web, hard-wired analog/digital communication links, wireless analog/digital communications links, any combination thereof, or other means for communicating.

When sorter/router 404 receives transaction request data, which can include financial, personal, and depositor/biller specific data elements) and transaction requests from user interface 402, it logs the receipt of the data within data repositories 406. Sorter/router 404 sorts and transmits the information to the third-party participant interface, 430. This transmission may be supported by Web, hardwired analog/digital communication links, wireless analog/digital communications links, fax, paper, any combination thereof, or other means for establishing and operating communications links. As an illustrative example, paper handling facilities 432, and a network server, 434 are illustrated in FIG. 4. Participant systems, 440, receive the transaction request data.

In the case of electronic transmission, network 442 interconnects the third-party participant interface with participant systems 440. The Internet can be used, in which case, firewall(s) and access and routing hardware would exist as previously discussed, but these are not shown in FIG. 4 for clarity. Other forms of electronic communication may also be used to provide this network facility. Note that if participants have interactive access to the financial institution's systems, the interactive communications can be routed through the same Internet connection, and would typically also be managed by a network server, like network server 434. When transaction requests are sent to third-party participants, sorter/router 404 can log the transmission of information within data repositories 406.

The participant systems, 440, can process the information received in the transmission via links. Any single participant may have multiple types of accounts and have multiple relationships with customers of the financial institution, and may have internal links to an accounts receivable system, 449, for debits, and an accounts payable system, 450, and/or a payroll system, 451, both for direct deposits. These systems update to reflect the directive(s) received, and transmit back to the participant interface, 430, a confirmation of whether the processing of each request was successful and, if so, an applicable date for the request to become effective. Proxy dates using a logical sequencing methodology may also be used and can be assigned by either participant interface 430, or the appropriate participant system, and to the accounts receivable system 449, the accounts payable system 450, or the payroll system 451. Proxy dates can also be assigned by sorter/router 404. The entity and manor in which dates are assigned can be set according to a participant's preference.

Participant interface 430 transmits the confirmation and applicable date for a request to become effective back to sorter/router 404. This transmission can be accomplished with the same communications link used to send the request from the sorter/router to the interface. Sorter/router 404 logs the received confirmation within data repositories 406. In at least some embodiments, upon receiving confirmations to all outstanding transaction requests, the sorter/router creates a transmission to fulfillment system 410. This transmission may be supported by Web, hardwired analog/digital communication links, wireless analog/digital communications links, fax, paper, any combination thereof, or other means for establishing and operating communications links.

As previously discussed, in example embodiments, fulfillment system 410 receives the transmission from the data repositories and creates, queues and produces a confirmation for the account holder impacted by the requested changes. The account-holder confirmation may be delivered via Web, Email, hardwired analog/digital communication links, wireless analog/digital communications links, fax, paper, postal service, courier service, telegram, voice response unit (VRU), telephone call, any combination thereof, or other means preferable to the account holder for communicating a confirmation of activity. Creation and delivery of the confirmation can also be logged within data repositories 406.

User interface 402, as previously discussed, can be accessible in some embodiments via the branch terminal 416 of the financial institution, via terminals within call center 418, or via remote terminals or personal computers, 426 and 428. In some embodiments, any and all of these access points can be used to review all elements of the status of the process throughout the processing of a request and afterward via a status transaction interface that can interact with sorter/router 404. In such a case, sorter/router 404 queries databases within data repositories 406 for the needed information then transmits appropriate responses back through user interface 402 for display. The system can also be set up so that a user of any of these terminals can log free-form queries that will be output from sorter/router 404 for research activities.

A computer program which implements all or parts of the invention through the use of systems like those illustrated in FIG. 4 can take the form of a computer program product residing on a computer usable or computer readable storage medium. One example of such a medium is a removable storage cartridge, as shown at 460 in FIG. 4. Such a cartridge might store computer program instructions optically, such as in the case of a DVD-RAM cartridge, or magnetically, such as in the case of a high-capacity diskette type device such as a so-called "ZIP" disk. A computer program product containing the program of instructions can be supplied in such a form, and loaded on the machines involved, either directly, or over a network. Such computer program instructions, also commonly referred to as "software" directs the operation of computing platforms or instruction execution platforms to carry out processes of embodiments of the invention. The "medium" can also be simply a stream of information being retrieved when the computer program product is "downloaded" through the Internet or an intranet. Computer programs can reside on any medium that can contain, store, communicate, propagate, or transport the program for use by or in connection with an instruction execution system, apparatus, or device. The computer usable or computer readable medium may be, for example, but not limited to, an electronic, magnetic, optical, electromagnetic, infrared or semiconductor system, or a propagation medium. Note that the computer usable or computer readable medium can even be paper or another suitable medium on which the program instructions are printed. In this case, the program could be electronically captured via optical scanning of the paper or other medium, then processed in a suitable manner.

Specific embodiments of an invention are described herein. One of ordinary skill in the computing and financial services arts will quickly recognize that the invention has other applications in other environments. In fact, many embodiments and implementations are possible. The following claims are in no way intended to limit the scope of the invention to specific embodiments described above.

The invention claimed is:

1. A computer-implemented method of processing account-holder requests to authorize a plurality of recurring third-party transactions for an account at a financial institution on behalf of an account holder, the method comprising:

providing, at the financial institution, a pre-existing list of prospective third-party participants to participate in a commercial service offering authorization for recurring third-party transactions with the account holder, wherein the prospective third-party participants include solicited businesses and employers, the solicited businesses and employers not currently enrolled in direct debits or automatic drafts for the account holder;

presenting the pre-existing list of prospective third-party participants to the account holder so that the account holder can select which third-party participants that will participate in the third-party transactions;

receiving, by a computer, a selection of third-party participants in the form of account-holder requests at the financial institution, to authorize the plurality of recurring third-party transactions, wherein at least one of the selected third-party participants is selected from the pre-existing list;

matching, using a computer, at least one specific account-holder request from among the account-holder requests to at least one specific third-party participant from among the list of prospective third-party participants, wherein the account-holder requests comprise at least one direct-deposit request;

forwarding the at least one specific account-holder request to the at least one specific third-party participant on behalf of the account holder; and receiving, at the financial institution, at least one participant confirmation from the at least one specific third-party participant, wherein the at least one participant confirmation comprises a confirmation that the at least one specific third-party participant's accounting system has been updated based on the at least one specific account-holder request;

forwarding, from the financial institution, the at least one participant confirmation of the at least one specific request to the account holder, wherein the forwarding is accomplished in accordance with account-holder communication preferences stored in an account-holder profile, wherein the account-holder profile consists of a company identifier for the third party participants, a company address for third-party participants, contact information for third-party participants, and formatting information for third-party participant transaction requests or returned responses; and adding to the account-holder profile the at least one third-party participant associated with the at least one participant confirmation and thereby authorizing third-party recurring transactions involving the at least one third-party participant and the account-holder.

2. The method of claim 1 wherein at least one of the forwarding of the at least one specific request to the at least one specific, third-party participant and the receiving, at the financial institution, the at least one participant confirmation from the at least one specific third-party participant is accomplished in accordance with participant communication preferences stored in a participant profile for the at least one specific third-party participant, the participant profile being stored in a data repository comprising participant profiles associated with the prospective third-party participants.

3. The method of claim 1, further comprising forwarding, from the financial institution, the at least one participant confirmation of the at least one specific request to the account holder, wherein the forwarding is accomplished in accordance with account-holder communication preferences stored in an account-holder profile.

4. The method of claim 1 wherein the account-holder requests comprise at least one direct-deposit request to authorize the at least one specific third-party participant to periodically direct deposit funds to the account.

5. The method of claim 1 wherein the account-holder requests comprise at least one direct-deposit request.

6. The method of claim 2 wherein the account-holder requests comprise at least one direct-deposit request.

7. The method of claim 3 wherein the account-holder requests comprise at least one direct-deposit request.

8. The method of claim 1 wherein the prospective third-party participants further include solicited businesses and employers, the businesses and employers enrolled in direct debits or automatic drafts for the account holder.

9. A computer program product comprising a non-transitory computer-readable storage medium having a computer program embodied therein for enabling a financial institution to authorize recurring third-party transactions for an account on behalf of an account holder, the computer program further comprising:

instructions for providing, at the financial institution, a pre-existing list of prospective third-party participants to participate in a commercial service offering authorization for recurring third-party transactions with the account holder, wherein the prospective third-party participants include solicited businesses and employers, the solicited businesses and employers not currently enrolled in direct debits or automatic drafts for the account holder;

instructions for presenting the pre-existing list of prospective third-party participants to the account holder to so that the account holder can select which third-party participants that will participate in the third-party transactions;

instructions for receiving a selection of third-party participants in the form of account-holder requests at the financial institution, wherein specific account-holder requests from among the account-holder requests authorizes specific third-party participants to perform a plurality of the recurring third-party transactions on behalf of the account holder, wherein at least one of the selected third-party participants is selected from the pre-existing list;

instructions for matching the specific account-holder requests from among the account-holder requests to the specific third-party participants from among the list of prospective third-party participants, wherein the account-holder requests comprise at least one direct-deposit request;

instructions for forwarding the specific account-holder requests to the specific third-party participants on behalf of the account holder; and instructions for receiving participant confirmations from the specific third-party participants;

instructions for forwarding, from the financial institution, the third-party participant confirmations of the specific request to the account holder, wherein the forwarding is accomplished in accordance with account-holder communication preferences stored in an account-holder profile, wherein the account-holder profile consists of a company identifier for the third party participants, a company address for third-party participants, contact information for third-party participants, and formatting information for third-party participant transaction requests or returned responses; and adding to the account-holder profile the at least one third-party participant associated with the at least one participant confirmation and thereby authorizing third-party recurring transactions involving the at least one third-party participant and the account-holder.

10. The computer program product of claim 9 wherein the computer program further comprises instructions for creating a participant profile comprising participant communication preferences for each prospective third-party participant.

11. The computer program product of claim 9 wherein the computer program further comprises instructions for creating an account-holder profile comprising account-holder communication preferences for the account holder.

12. The computer program product of claim 9 wherein the computer program further comprises instructions for creating an account-holder profile comprising account-holder communication preferences for the account holder.

13. The computer program product of claim 9 wherein the account-holder requests comprise direct-deposit requests.

14. The computer program product of claim 10 wherein the account-holder requests comprise direct-deposit requests.

15. The computer program product of claim 11 wherein the account-holder requests comprise direct-deposit requests.

16. The computer program product of claim 12 wherein the account-holder requests comprise direct-deposit requests.

17. The computer program product of claim 9 wherein the prospective third-party participants further include solicited businesses and employers, the businesses and employers enrolled in direct debits or automatic drafts for the account holder.

18. Apparatus to enable a financial institution to authorize recurring third-party transactions for an account on behalf of an account holder, the apparatus comprising:
 a computer processing device executing computer-readable instruction code structured to cause the computer processing device configured to:
 provide, at the financial institution, a pre-existing list of prospective third-party participants to participate in a commercial service offering authorization for recurring third-party transactions with the account holder, wherein the prospective third-party participants include solicited businesses and employers, the solicited businesses and employers not currently enrolled in direct debits or automatic drafts for the account holder;
 present the pre-existing list of prospective third-party participants to the account holder so that the account holder can select which third-party participants that will participate in the third-party transactions;
 receive a selection of third-party participants in the form of account-holder requests at the financial institution, wherein specific account-holder requests from among the account-holder requests authorizes specific third-party participants to perform a plurality of the recurring third-party transactions on behalf of the account holder, wherein at least one of the selected third-party participants is selected from the pre-existing list;
 match the specific account-holder requests from among the account-holder requests to the specific third-party participants from among the list of prospective third-party participants, wherein the account-holder requests comprise at least one direct-deposit request;
 forward the specific account-holder requests to the specific third-party participants on behalf of the account holder; and receive third-party participant confirmations from the specific third-party participants;
 forward, from the financial institution, the third-party participant confirmations of the specific request to the account holder, wherein the forwarding is accomplished in accordance with account-holder communication preferences stored in an account-holder profile, wherein the account-holder profile consists of a company identifier for the third party participants, a company address for third-party participants, contact information for third-party participants, and formatting information for third-party participant transaction requests or returned responses; and
 add to the account-holder profile the at least one third-party participant associated with the at least one participant confirmation and thereby authorizing third-party recurring transactions involving the at least one third-party participant and the account-holder.

19. The apparatus of claim 18 wherein the computer processing device is further configured to create a participant profile comprising participant communication preferences for each prospective third-party participant.

20. The apparatus of claim 18, wherein the account-holder profile comprises an account-holder communication preferences for the account holder.

21. The apparatus of claim 18, wherein the account-holder profile comprises a third-party communication preferences for the at least one specific third-party participant.

22. The apparatus of claim 18 wherein the prospective third-party participants further include solicited businesses and employers, the businesses and employers enrolled in direct debits or automatic drafts for the account holder.

23. A system to enable a financial institution to authorize recurring third-party transactions for an account on behalf of an account holder, the system comprising:
 a device for providing, at the financial institution, a pre-existing list of prospective third-party participants to participate in a commercial service offering authorization for recurring third-party transactions with the account holder, wherein the prospective third-party participants include solicited businesses and employers, the businesses and employers not currently enrolled in direct debits or automatic drafts for the account holder;
 a processor configured for presenting the pre-existing list of prospective third-party participants to the account holder so that the account holder can select which third-party participants that will participate in the third-party transactions;
 a user interface to receive a selection of third-party participants in the form of account-holder requests, wherein specific account-holder requests from among the account-holder requests authorizes specific third-party participants to perform a plurality of the recurring third-party transactions on behalf of the account holder, wherein at least one of the selected third-party participants is selected from the pre-existing list;
 at least one computer operatively connected to the user interface, the at least one computer to match the specific account-holder requests from among the account-holder requests to the specific third-party participants from among the third-party participants, wherein the account-holder requests comprise at least one direct-deposit request;
 a third-party participant interface to forward the specific account-holder requests to the specific third-party participants, the third-party participant interface operatively connected to the at least one computer;
 at least one data repository operatively connected to the at least one computer, the at least one date repository further comprising third-party participant profiles; and
 a fulfillment system to:
 provide account-holder confirmation of the specific account-holder requests, by forwarding, from the financial institution, the specific third-party participant confirmation of the specific request to the account holder, wherein the forwarding is accomplished in accordance with account-holder communication preferences stored in an account-holder profile, wherein the account-holder profile consists of a company identifier for the third party participants, a company address for third-party participants, contact information for third-party participants, and formatting information for third-party participant transaction requests or returned responses, the fulfillment system operatively connected to the at least one computer; and
 add to the account-holder profile the at least one third-party participant associated with the at least one participant confirmation and thereby authorizing third-party recurring transactions involving the at least one third-party participant and the account-holder.

24. The system of claim 23 wherein the third-party participant profiles further comprise participant communication preferences for the specific third-party participants.

25. The system of claim 23 wherein the specific third-party participants comprise direct depositors.

26. The system of claim 24 wherein the at least one data repository further comprises account-holder profiles, the account-holder profiles further comprising account-holder communication preferences.

27. The system of claim 26 wherein the account-holder communication preferences comprises at least one of electronic and paper communication preferences.

28. The system of claim 25 wherein the at least one data repository further comprises account-holder profiles, the account-holder profiles further comprising account-holder communication preferences.

29. The system of claim 28 wherein the account-holder communication preferences comprises at least one of electronic and paper communication preferences.

30. The system of claim 23 wherein the user interface is operable to receive the account-holder requests from the account-holder over the Internet.

31. The system of claim 24 wherein the user interface is operable to receive the account-holder requests from the account holder over the Internet.

32. The system of claim 25 wherein the user interface is operable to receive the account-holder requests from the account holder over the Internet.

33. The system of claim 23 wherein the prospective third-party participants further include solicited businesses and employers, the businesses and employers enrolled in direct debits or automatic drafts for the account holder.

* * * * *